(12) United States Patent
Engelmann

(10) Patent No.: US 6,335,906 B1
(45) Date of Patent: Jan. 1, 2002

(54) PORTABLE OBJECT, IN PARTICULAR A WATCH, INCLUDING MULTIPLE SELECTABLE ELECTRONIC MODULES

(75) Inventor: Adolf Engelmann, Solothurn (CH)

(73) Assignee: ETA SA Fabriques d'E Bauches, Grenchen (CH)

( * ) Notice: Subject to any disclaimer, the term of this patent is extended or adjusted under 35 U.S.C. 154(b) by 0 days.

(21) Appl. No.: 09/192,602

(22) Filed: Nov. 17, 1998

(30) Foreign Application Priority Data

Nov. 27, 1997 (CH) .................................................. 2744/97

(51) Int. Cl.⁷ .............................. G04F 47/00; G06F 7/04; H04B 1/38
(52) U.S. Cl. ............................ 368/10; 340/5.2; 340/5.64; 340/5.8
(58) Field of Search .......................... 368/10, 47; 455/66, 455/101, 550, 575, 90, 556; 340/10.34, 825.31, 825.64, 825.72, 5.1–5.92, 10.2

(56) References Cited

U.S. PATENT DOCUMENTS

| | | | | |
|---|---|---|---|---|
| 3,822,547 A | * | 7/1974 | Fujita | 368/10 |
| 4,403,869 A | * | 9/1983 | Crutcher | 368/10 |
| 4,481,382 A | * | 11/1984 | Villa-Real | 455/556 |
| 4,800,543 A | * | 1/1989 | Lyndon-James et al. | 368/10 |
| 4,850,040 A | * | 7/1989 | Teich et al. | 455/101 |
| 5,049,728 A | | 9/1991 | Rovin | |
| 5,113,183 A | * | 5/1992 | Mizuno et al. | 235/382 |
| 5,202,550 A | | 4/1993 | Kocznar et al. | |
| 5,537,102 A | * | 7/1996 | Pinnow | 340/5.8 |
| 5,550,358 A | * | 8/1996 | Tait et al. | 235/380 |
| 5,684,828 A | * | 11/1997 | Bolan et al. | 340/10.2 |
| 5,715,525 A | * | 2/1998 | Tarusawa et al. | 455/101 |
| 5,734,330 A | * | 3/1998 | Nakamura | 340/825.31 |
| 5,737,699 A | * | 4/1998 | Farrar et al. | 368/10 |
| 5,883,582 A | * | 3/1999 | Bowers et al. | 340/825.54 |
| 6,011,488 A | * | 1/2000 | Busser | 340/825.54 |
| 6,037,879 A | * | 3/2000 | Tuttle | 340/825.54 |

FOREIGN PATENT DOCUMENTS

| | | |
|---|---|---|
| DE | 37 40794 A1 | 6/1989 |
| DE | 40 15 685 | 11/1991 |
| DE | 0 796 965 A1 | 9/1997 |

OTHER PUBLICATIONS

Patent Abstracts of Japan vol. 004 No. 177 (P–039),Dec. 9, 1980 & JP 55 121179 A (Rhythm Watch Co. Ltd), Sep. 18, 1990. Abstract.
Patent Abstracts of Japan, vol. 001 No. 136 (E–062), Nov. 10, 1977 & JP 52 073070 A (Seiko Epson Corp), Jun. 18, 1977). Abstract.

\* cited by examiner

*Primary Examiner*—Diego Gutierrez
*Assistant Examiner*—Jeanne-Marguerite Goodwin
(74) *Attorney, Agent, or Firm*—Griffin & Szipl, P.C.

(57) ABSTRACT

A portable object, in particular a wristwatch (1), includes a case (2) with which are associated at least two different electronic modules, each module allowing access to a particular service, the portable object also including a selection switch (22) for selecting and activating one of said electronic modules as a function of the service desired by the user.

7 Claims, 3 Drawing Sheets

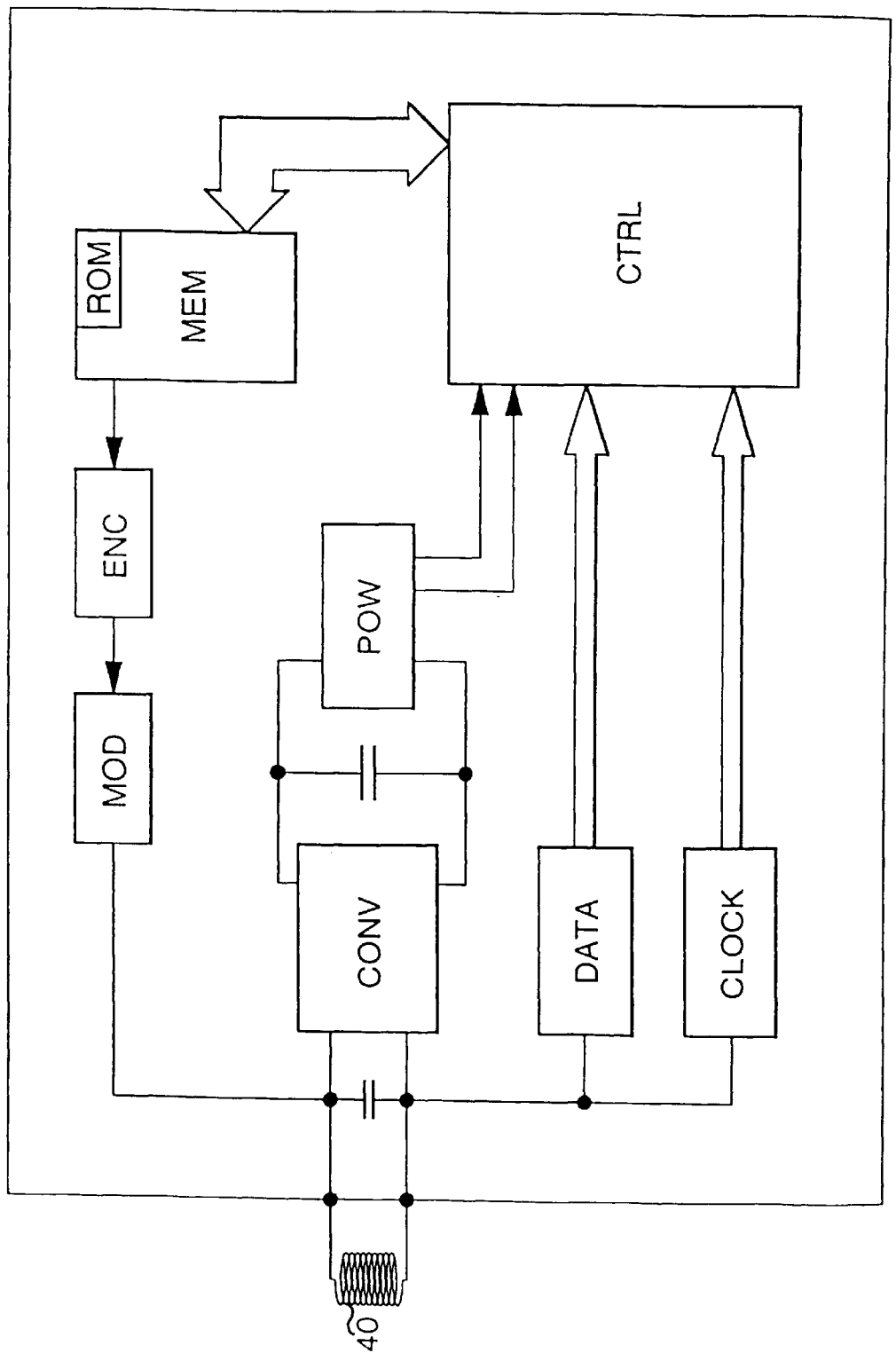

PORTABLE OBJECT, IN PARTICULAR A WATCH, INCLUDING MULTIPLE SELECTABLE ELECTRONIC MODULES

FIELD OF THE INVENTION

The present invention concerns a portable object, in particular a timepiece, including a case with which is associated an electronic module intended to allow contactless and wireless communication between the portable object and an external terminal provided for this purpose.

The present invention is intended for a multitude of situations or places where for example it is checked whether or not a person has a right of access, the latter being either upon payment or free of charge.

The invention is particularly intended for systems for controlling access to industrial sites (research and development laboratories, production units, etc.) and to public buildings (stadiums, museums, cinemas or suchlike) in which the portable object is presented by the holder thereof to a control device which only authorizes access to the site or to the building if the data stored in the object worn by the person corresponds to an access authorization, the payment of a sufficient sum or even a suitable expiration date.

BACKGROUND OF THE INVENTION

Access control systems, which use cards provided with a magnetic card able to be inserted into the slot of an access control terminal inside which the data carried by the magnetic strip are read, are known. When this data is recognized, access authorization is issued and new data can be written on the magnetic strip.

Magnetic strip access control systems are, however, sometimes difficult to use, in particular because of the narrowness of the slot into which the card has to be inserted for accurate reading of its content. Thus, when a magnetic card access control system is used on certain equipment such as, for example, ski lifts in winter sports resorts, handling of the magnetic card by users whose hands are not free proves particularly slow and awkward. Moreover, the repeated insertion of the card into the slot of the terminal causes wear of the magnetic strip on which the useful data is stored.

In order to overcome this drawback, there has been proposed an automatic control and identification system for objects in which a portable object encloses, in a case, an electronic module including in particular a memory for storing useful data such as an identification code, a transitive device for radio transmitted signals, and an antenna electrically connected to the transitive device. In this object control system, when coupled to an external terminal provided for this purpose, the transitive device, is capable of transmitting radio signals corresponding to the reading of the data stored in the memory circuit and, if necessary, receiving radio signals for writing new useful data into such memory circuit. Thus, when the external circuit transmits an interrogation signal, the detection of this signal by the portable object causes the transmission, for example of an identification code for this object, which then allows the terminal to identify this object and consequently to check the identity of the wearer thereof.

The above automatic object identification system has numerous advantages.

Access control, whether upon payment or free of charge, is made easier and quicker. The necessary identification or other data are written into and read from a memory in a contactless and wireless manner. Thus, for example, the mechanical insertion of a card into the slot of a reading device, often made difficult by circumstances, is omitted. Moreover, this system is entirely passive, i.e. it does not require any power source of its own. The power necessary for the operation thereof is provided by the electromagnetic waves transmitted by the object identification terminal.

At the present time, however, the different manufacturers in the market propose contactless object control systems which differ from each other, in particular as regards the structure of the electronic modules used in the objects to be checked, which makes these systems totally incompatible with each other. The user thus finds himself obliged to purchase, for each required service, for example for the ski lifts of several ski resorts, as well as opening the door of a hotel room and for payments at the bar thereof, the object which corresponds thereto. It will easily be understood that such a situation is not very convenient for the user. It multiplies the number of portable objects, increases the risk of theft, loss or forgetting such objects, and involves a considerable increase in cost.

SUMMARY OF THE INVENTION

An object of the present invention is to overcome the problems and drawbacks described hereinbefore by proposing a portable object, in particular a wristwatch, which allows a plurality of different services to be selected personally and simultaneously.

The invention therefore concerns a portable object for contactless access control systems, including a case with which at least one antenna is associated, characterized in that the case includes at least two different electronic modules, each electronic module allowing access to a particular service, the portable object also including means for selecting and activating one of said electronic modules as a function of the service desired by the user.

As a result of the features of the present invention, the user can have access, simultaneously and with great ease, to a plurality of different services, for example access to the ski lifts of several winter sports resorts, opening the door of a hotel room, payment of a cinema ticket and others, using a single portable object. The risks of loss, theft or forgetting the object are minimized, and the costs reduced.

According to an advantageous feature of the invention, the selection and activation means control the movement of an electric contact member to connect the electronic module which corresponds to the service required by the user.

Other features and advantages of the present invention will appear more clearly upon reading the following description of an embodiment of the invention, given purely by way of non-limiting illustration, this description being made in conjunction with the annexed drawings.

BRIEF DESCRIPTION OF THE DRAWINGS

FIG. 3 is a schematic representation of the different units forming an electronic unit.

DESCRIPTION OF THE INVENTION

It will be noted that the present invention is not limited to particular frequency ranges for the antennae integrated in the case, and it is also not limited to specific services. Moreover, although the following description concerns timepieces, in particular a wristwatch, the present invention is not limited to such timepieces, and can easily apply to any other portable object in which are arranged at least two electronic modules allowing reception and transmission of radio signals corresponding to the reading of data stored in a memory circuit, and if necessary, the writing of new useful data into this memory circuit.

Figure 1:
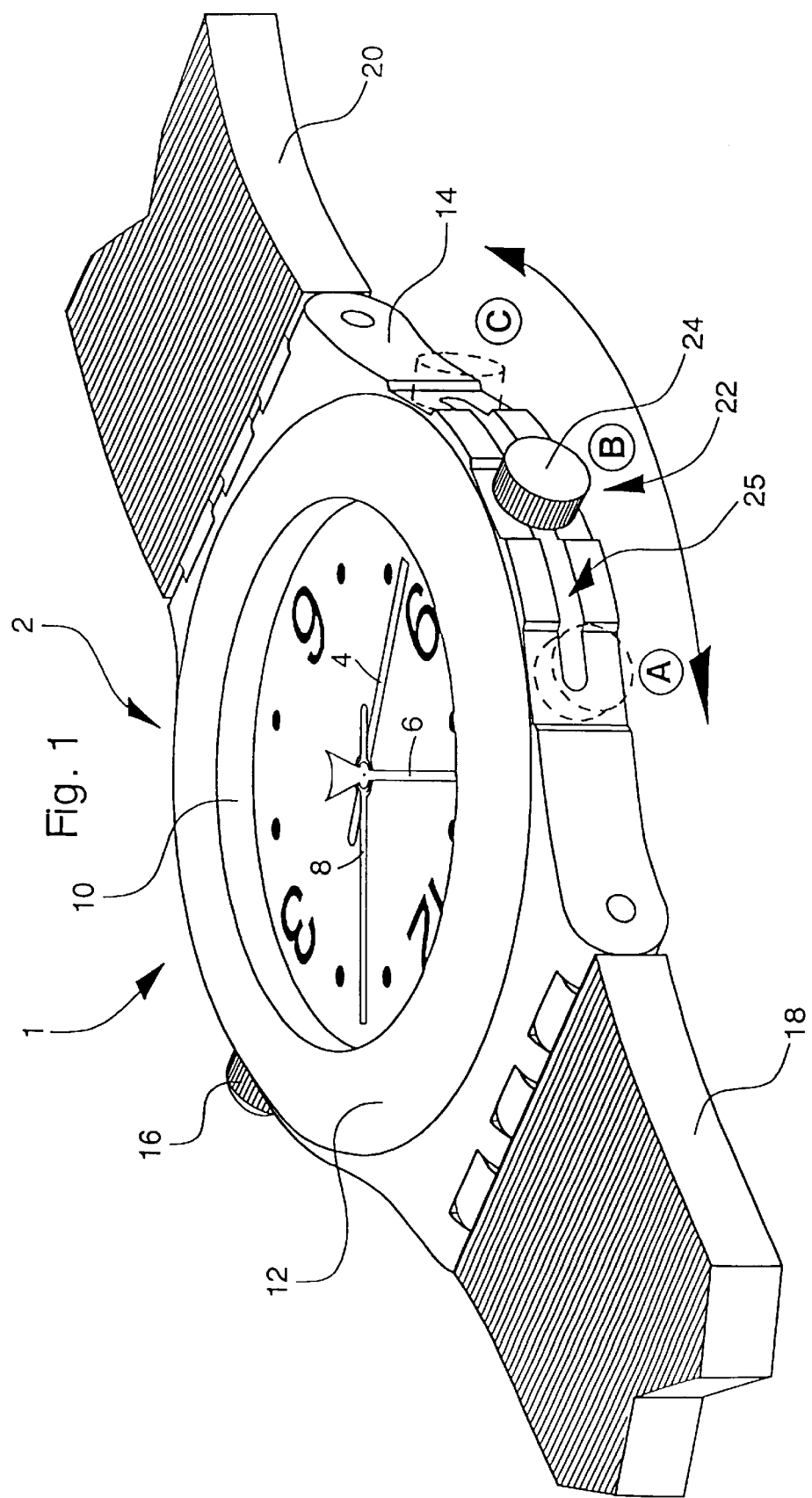
FIG. 1 is a perspective view of a wristwatch according to the invention including means for selecting and activating the electronic modules.

Reference will first be made to FIG. 1, which shows a timepiece according to the invention, designated as a whole by the general numerical reference 1.

Timepiece 1 includes in a conventional manner a case 2 made for example of a plastic material in accordance with a well known injection molding technique.

Timepiece 1 further includes a clockwork movement (not shown) housed within case 2 and coupled to indicators 4, 6 and 8 forming respectively an hour hand, a minute hand and a second hand.

Timepiece 1 is sealed by means of a crystal 10 and a bezel 12. This latter is fixedly mounted on case 2, for example by gluing or by ultrasound welding.

Case 2 includes a middle part 14 which carries in particular a winding crown 16, for example for winding the clockwork movement of timepiece 1 or for adjusting the display of indicators 4, 6 and 8.

Strands 18 and 20 of a wristlet (not shown) are fixed onto middle part 14 of case 2.

According to the invention, in addition to winding crown 16, middle part 14 of case 2 also carries means 22 for selecting and activating the desired service.

In the example shown in FIG. 1, these selection and activation means 22 take the form of a switch 24, able to be actuated manually, and sliding in a guide groove 25 arranged in middle part 14 of case 2, opposite winding crown 16.

Switch 24 can be moved for example between three different positions designated by the alphabetical references A, B and C in FIG. 1. Each of these three positions A, B and C corresponds to the selection and activation of a particular service, for example access to the ski lifts in a winter sports resort, unlocking a hotel room door or even payment of a cinema ticket. In order to simplify the user's task, and to allow him rapidly to select the service he desires, (a code or indication can, for example, be marked on crystal 10, allowing the service which corresponds to the position of switch 24 which he has selected to be visually identified.)

It is of course understood that the present invention is not limited to a given number of services, nor to a determined type of service (skiing, hotel, cinema, bank transactions or suchlike). Moreover, one can imagine giving selection and activation means 22 a different form to that of switch 24. It may be in particular a crown having a push button function. Likewise, one can envisage displaying the code or indication allowing the selected service to be identified by means of an electro-optical display cell.

Figure 2:
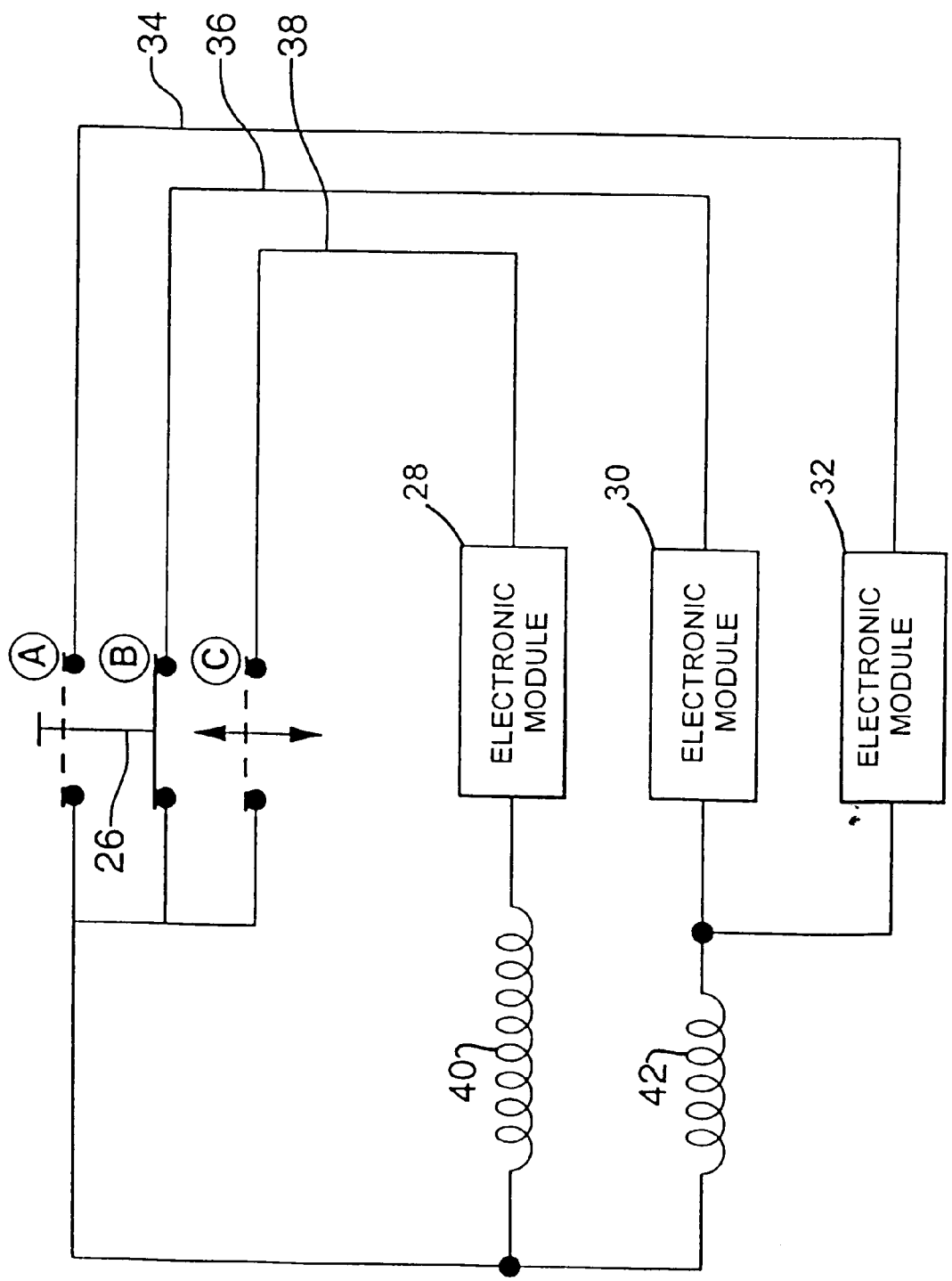
FIG. 2 is an electric diagram of the connection of the electronic modules corresponding to the different desired services in which the electric contact member which allows connection or disconnection of the modules is shown.

The movement of switch 24 from one of its selection/activation positions A, B or C to the following or previous position causes the movement of an electric contact member 26 (FIG. 2) which causes the connection of whichever of the three electronic modules 28, 30 or 32 which corresponds to the service selected by means of said switch 24.

More precisely, the three electronic modules 28, 30 and 32 are housed in case 2 of timepiece 1. As will have been understood, each module 28, 30 or 32 corresponds to a particular service and is inserted in an independent electric circuit, respectively 34, 36 and 38. As is clear from FIG. 2, these electric circuits 34, 36 and 38 are normally in the open state. Only the movement of switch 24 from one of positions A, B or C to the following or previous position can cause the movement of electric contact member 26 which then electrically closes the circuit 34, 36 or 38 in which the electronic module, respectively 28, 30 or 32, corresponding to the selected service is inserted. When circuit 34, 36 or 38 is electrically closed by contact member 26, the power necessary for the operation of the corresponding electronic module 28, 30 or 32 is provided by the electromagnetic waves transmitted by the external control terminal provided for the identification of timepiece 1.

Electronic module 28 is electrically connected to a first antenna 40 whose resonance frequency can be set at 125 kHz. This frequency is particularly well suited to services which require neither a high degree of security between the portable object and the external control terminal (ski lifts for example), nor significant flux of data exchange. Advantageously, the portable object can be quite far away from the external control terminal during the transaction, typically at a distance of the order of 20 to 50 cm.

Again purely by way of illustrative example, electronic modules 30 and 32 are electrically connected in parallel to a second antenna 42 whose resonance frequency can be fixed at 13.56 MHz. This frequency is well suited to services requiring significant transaction security (in particular bank transactions) and involving significant data exchanges.

It goes without saying that the present invention is not limited to particular frequencies, and that one can provide as many antennae as there are electronic modules in the case of the portable object. On the other hand, electronic modules 28, 30 and 32 and their antennae 40, 42 can, for example, be housed in bezel 12 of case 2 as shown in Koch U.S. Pat. No. 5,798,984.

By way of example, electronic module 28 which is electrically connected to antenna 40 whose resonance frequency is fixed at 125 kHz can be formed by an integrated circuit marketed by the company EM Microelectronic SA in Marin, Switzerland, under the reference V4050. It will be understood however that, according to the invention, all the electronic modules originating from the different manufacturers on the market at the present time can be associated with case 2 of timepiece 1.

With reference to FIG. 3 the different operating units which form such an integrated circuit will now be examined.

Antenna 40 is electrically connected to an AC/DC converter CONV which transforms the alternating electromagnetic wave picked up by antenna 40 into an internal DC supply voltage for the integrated circuit.

A power control device POW assures that the level of internal DC voltage provided by converter CONV is sufficient to allow proper operation of the integrated circuit.

The signal picked up by antenna 40 is also demodulated and decoded by a data extraction chain DATA and a clock signal chain CLOCK to provide the logic levels and the internal frequency to a logic control circuit CTRL.

Logic control circuit CTRL controls the operation of the integrated circuit. It gives the system a high level of operating security as a result, in particular, of a 32 bit password and a read protected zone for the organization of security. Each logic control circuit CTRL is unique and differs from the others by an identification number and a serial number programmed by laser into a ROM type memory.

Control circuit CTRL also contains an algorithm which allows the transactions to be coded and thus the security of the system to be increased as regards any attempt at fraudulent use. It also assures protection by preventing unauthorized reading and writting over the stored data. Finally, control circuit CTRL allows a selection to be made between different operating modes of the integrated circuit in which it is implanted.

For the storing of useful data, each integrated circuit is provided with a 1 kbit EEPROM type memory MEM.

Finally, the electronic circuit re-transmits the data to the external control terminal in the form of bit signals via an encoding device ENC and a modulator MOD.

It goes without saying that in addition to the means described, various simple alternatives and modifications fall within the scope of the present invention.

What is claimed is:

1. A timepiece for contactless access control systems enabling a user to access different access control services, said timepiece including a case, having at least one antenna thereon, and enclosing a first electronic module allowing access to a first control service upon transmission of a first access authorization code identifying the timepiece, the case housing a second electronic module allowing access to a second access control service upon transmission, via said at least one antenna, of a second access authorization code, different from said first authorization code and also identifying the timepiece, the timepiece also including means carried by said case for selecting and activating one of said electronic modules as a function of the access control service desired by the user.

2. A portable object according to claim 1, wherein the selection and activation means control the movement of an electric contact member for the connection of the electronic module which corresponds to the service sought by the user.

3. A timepiece according to claim 2, wherein each electronic module is disposed in a respective independent electric circuit that is normally in the open state, the electric contact member closing the electric circuit in which the electronic module allowing access to the service selected by the user is disposed.

4. A timepiece according to claim 1, wherein the selection and activation means (take the form of) comprise a manually actuated switch slidable in a guide-groove in said case.

5. A timepiece according to claim 1, wherein the resonance frequency of said at least one antenna is set at 125 kHz.

6. A timepiece according to claim 1, wherein the resonance frequency of said at least one antenna is set at 13.56 MHz.

7. A timepiece according to claim 5 wherein the electronic module electrically connected to the at least one antenna whose resonance frequency is set at 125 kHz comprises an integrated circuit.

* * * * *

UNITED STATES PATENT AND TRADEMARK OFFICE
CERTIFICATE OF CORRECTION

PATENT NO.     : 6,335,906 B1
DATED          : January 1, 2002
INVENTOR(S)    : Adolf Engelmann It is certified that error appears in the above-identified patent and that said Letters Patent is hereby corrected as shown below:

<u>Title page,</u>
Item [73], please correct the name of the Assignee to read:
-- Eta SA Fabriques d'Ebauches --.

Signed and Sealed this

Sixteenth Day of April, 2002

Attest:

JAMES E. ROGAN
*Attesting Officer*  *Director of the United States Patent and Trademark Office*